(12) United States Patent
Haemori et al.

(10) Patent No.: US 11,551,867 B2
(45) Date of Patent: Jan. 10, 2023

(54) DIELECTRIC COMPOSITION, DIELECTRIC THIN FILM, DIELECTRIC ELEMENT, AND ELECTRONIC CIRCUIT BOARD

(71) Applicant: TDK CORPORATION, Tokyo (JP)

(72) Inventors: Masamitsu Haemori, Tokyo (JP); Toshio Asahi, Tokyo (JP); Hitoshi Saita, Tokyo (JP)

(73) Assignee: MAEDA & SUZUKI PATENT CO., LTD., Tokyo (JP)

( * ) Notice: Subject to any disclaimer, the term of this patent is extended or adjusted under 35 U.S.C. 154(b) by 246 days.

(21) Appl. No.: 17/034,507

(22) Filed: Sep. 28, 2020

(65) Prior Publication Data

US 2021/0110974 A1     Apr. 15, 2021

Related U.S. Application Data

(60) Provisional application No. 62/913,260, filed on Oct. 10, 2019.

(51) Int. Cl.
  *H01G 4/10* (2006.01)
  *H01G 4/33* (2006.01)

(52) U.S. Cl.
  CPC ............ *H01G 4/10* (2013.01); *H01G 4/33* (2013.01)

(58) Field of Classification Search
  CPC ........... H01G 4/10; H01G 4/1218; H01G 4/33
  USPC ............................................. 361/311
  See application file for complete search history.

(56) References Cited

U.S. PATENT DOCUMENTS

| | | | | |
|---|---|---|---|---|
| 4,964,016 A | * | 10/1990 | Marchand | H01G 4/008 29/25.42 |
| 2002/0010072 A1 | * | 1/2002 | Fukui | C01G 23/006 252/500 |
| 2013/0258545 A1 | * | 10/2013 | Yano | H01G 4/306 361/301.4 |
| 2016/0027587 A1 | * | 1/2016 | Furukawa | C23C 18/1225 428/697 |
| 2019/0066920 A1 | * | 2/2019 | Kim | H01G 4/1227 |
| 2021/0276868 A1 | * | 9/2021 | Asahi | H01G 4/1218 |

FOREIGN PATENT DOCUMENTS

JP     2001-135143 A     5/2001

OTHER PUBLICATIONS

PLD and Characterisation of Perovskite-Type, Marozau et al, 7145 to 7154, Sep. 2011.*

* cited by examiner

*Primary Examiner* — Timothy J Thompson
*Assistant Examiner* — Guillermo J Egoavil
(74) *Attorney, Agent, or Firm* — Oliff PLC

(57) ABSTRACT

The present invention provides a dielectric composition having high relative permittivity and insulation resistance at high temperature. The dielectric composition includes a main component expressed by a compositional formula $(Sr_{1-x}, Ca_x)_m(Ti_{1-y}Hf_y)O_{3-\delta}N_\delta$, in which $0 < x \leq 0.15$, $0 < y \leq 0.15$, $0.90 \leq m \leq 1.15$, and $0 < \delta \leq 0.05$ are satisfied.

6 Claims, 6 Drawing Sheets

DIELECTRIC COMPOSITION, DIELECTRIC THIN FILM, DIELECTRIC ELEMENT, AND ELECTRONIC CIRCUIT BOARD

TECHNICAL FIELD

The present invention relates to a dielectric composition, a dielectric thin film, a dielectric element, and an electronic circuit board.

BACKGROUND

Patent Document 1 discloses an invention relating to a dielectric thin film including a dielectric composition having a perovskite structure and also discloses that nitrogen is included in the perovskite structure. Patent Document 1 discloses that by having nitrogen, the dielectric thin film which can be produced at low cost even in case it is on a substrate having a low heat resistance while maintaining good dielectric properties.

[Patent Document 1] JP Patent Application Laid Open No. 2001-135143

SUMMARY

Recently, a dielectric composition and the like having higher relative permittivity and insulation resistance at high temperature are demanded.

The object of the present invention is to provide the dielectric composition having high relative permittivity and insulation resistance at high temperature.

The dielectric composition according to the present invention includes a main component expressed by a compositional formula $(Sr_{1-x}, Ca_x)_m(Ti_{1-y}Hf_y)O_{3-\delta}N_\delta$, in which $0 < x \leq 0.15$,
$0 < y \leq 0.15$,
$0.90 \leq m \leq 1.15$, and
$0 < \delta \leq 0.05$ are satisfied.

The dielectric composition having the above-mentioned main component attains high relative permittivity and insulation resistance at high temperature.

The dielectric thin film according to the present invention includes the above-mentioned dielectric composition.

The dielectric element according to the present invention includes the above-mentioned dielectric thin film and an electrode.

The electrode may be an Ni foil and the dielectric element may have the dielectric thin film formed on the Ni foil.

The electronic circuit board of the present invention includes the above-mentioned dielectric element.

DETAILED DESCRIPTION

Hereinafter, the present invention is described based on embodiments shown in figures.

(Thin Film Capacitor 1)

Figure 1:
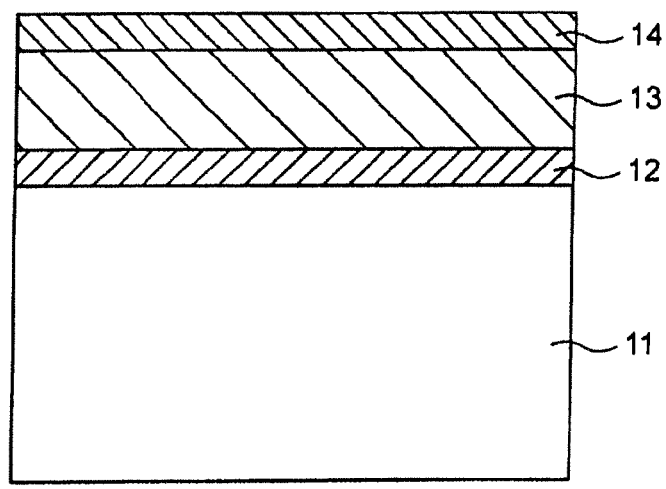
FIG. 1 is a schematic figure of a thin film capacitor according to an embodiment of the present invention.

A schematic diagram of a thin film capacitor according to the present embodiment is shown in FIG. 1. Note that, the thin film capacitor is one type of dielectric elements. The thin film capacitor 1 shown in FIG. 1 is made by forming a first electrode 12 and a dielectric thin film 13 in this order on a substrate 11; and a second electrode 14 is formed on the dielectric thin film 13. Note that, the substrate 11 does not necessarily have to be used. For example, the first electrode 12 is a metal foil such as a Ni foil and the like, and the dielectric thin film 13 may be formed on the metal foil.

A material of the substrate 11 is not particularly limited, and Si monocrystal substrate may be used as the substrate 11 since it is easy to obtain and also is excellent from the point of cost.

A material of the first electrode 12 and a material of the second electrode 14 are not particularly limited as long as these function as electrodes. For example, Pt, Ag, Ni, and the like may be mentioned. As mentioned in above, the substrate 11 may not be used and the first electrode 12 may be a metal foil such as Ni foil and the like. A thickness of the first electrode 12 and the second electrode 14 is not particularly limited as long as it is a thickness which can function as the electrode, and the thickness is preferably 0.1 μm or more and 1.0 μm or less.

The dielectric thin film 13 is a dielectric composition having a main component expressed by a compositional formula $(Sr_{1-x}, Ca_x)_m(Ti_{1-y}Hf_y)O_{3-\delta}N_\delta$, in which $0 < x \leq 0.15$,
$0 < y \leq 0.15$,
$0.90 \leq m \leq 1.15$, and
$0 < \delta \leq 0.05$ are satisfied. Note that, the above-mentioned compositional formula represents an atomic ratio of each element. Also, the above-mentioned main component may have a perovskite structure in which A site element is Sr and Ca, and B site element is Ti and Hf.

The dielectric composition having the above-mentioned main component attains high relative permittivity and insulation resistance at high temperature.

In the above main component, x may be $0.01 \leq x \leq 015$ and y may be $0.01 \leq y \leq 0.15$. Also, δ may be 0.01 or more. Further, δ is preferably 0.03 or less.

Note that, elements other than shown in the above-mentioned composition may be included as impurities. The impurities may be included within the range which does not significantly compromise the relative permittivity and the insulation resistance at high temperature. Specifically, the impurities may be included by 5 mass % or less in total when the dielectric composition as a whole is 100 mass %.

A method for analyzing the composition of the dielectric thin film 13 is not particularly limited. For example, a composition analysis can be performed to a part which is several nm deep from a surface of the dielectric thin film by ESCA (Electron Spectroscopy for Chemical Analysis). For the dielectric thin film 13 of the present embodiment, particularly a composition analysis can be performed by curve fitting a narrow scan spectrum of N1s. Note that, ESCA may be referred as XPS (X-ray Photoelectron Spectroscopy).

In the thin film capacitor having the dielectric thin film including a $SrTiO_3$-$CaHfO_3$ based dielectric composition, as a content ratio of $SrTiO_3$ increases in the dielectric thin film, the relative permittivity of the dielectric thin film increases and an electric capacity of the thin film capacitor increases. Particularly, the relative permittivity of the dielectric thin film increases when a molar ratio satisfies $SrTiO_3$: $CaHfO_3$=85:15 to 100:0 or so.

On the contrary to this, the insulation resistance of the dielectric thin film including the $SrTiO_3$-$CaHfO_3$ based dielectric composition is highest when the molar ratio satisfies $SrTiO_3$: $CaHfO_3$=10:90 to 20:80 or so. Further, as the content ratio of $SrTiO_3$ increases, the insulation resistance of the dielectric thin film decreases. As the insulation resistance decreases, the electric capacity when DC current is applied to the thin film capacitor decreases and a dielectric loss when AC current is applied increases.

Further, as the content ratio of $SrTiO_3$ increases, the insulation resistance at high temperature decreases. Along with that, the electric capacity when DC current is applied to the thin film capacitor at high temperature further decrease and the dielectric loss when AC current is applied to the thin film capacitor at high temperature further increase.

Note that, a change in the insulation resistance with respect to the temperature change is small when a molar ratio satisfies $SrTiO_3$: $CaHfO_3$ =10:90 to 20:80 or so.

Hereinabove, in the thin film capacitor having the dielectric thin film including the $SrTiO_3$-$CaHfO_3$ based dielectric composition, as the content ratio of $SrTiO_3$ increases, the electric capacity increases and the insulation resistivity at high temperature decreases.

Regarding the thin film capacitor having the dielectric thin film including the $SrTiO_3$-$CaHfO_3$ based dielectric composition, the present inventors have found that by substituting part of O with N, the insulation resistance at high temperature can be improved while maintaining the electric capacity high. In other words, the present inventors have found that the thin film capacitor having sufficiently high electric capacity and insulation resistance at high temperature can be obtained.

Also, the dielectric thin film 13 may be a polycrystal film. A thickness of the dielectric thin film 13 is not particularly limited. It may be 30 nm to 1000 nm, and may be 30 nm to 600 nm.

(Electronic Circuit Board 90)

The electronic circuit board according to the present embodiment has the above-mentioned dielectric thin film. The electronic circuit board may have an electronic component such as the thin film capacitor including the above-mentioned dielectric thin film. The electronic component such as the thin film capacitor and the like may be mounted on the surface of the electronic circuit board. The electronic component such as the thin film capacitor and the like may be embedded in the electronic circuit board.

Figure 2A:
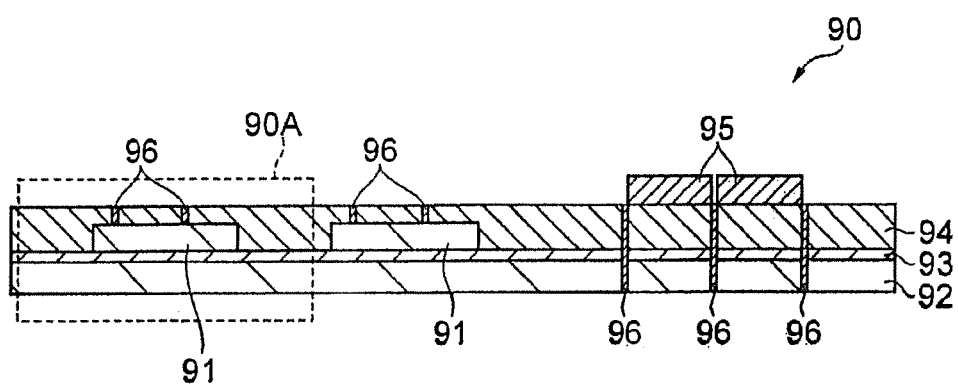
FIG. 2A is a schematic cross section of an electronic circuit board according to an embodiment of the present invention.
Figure 2B:
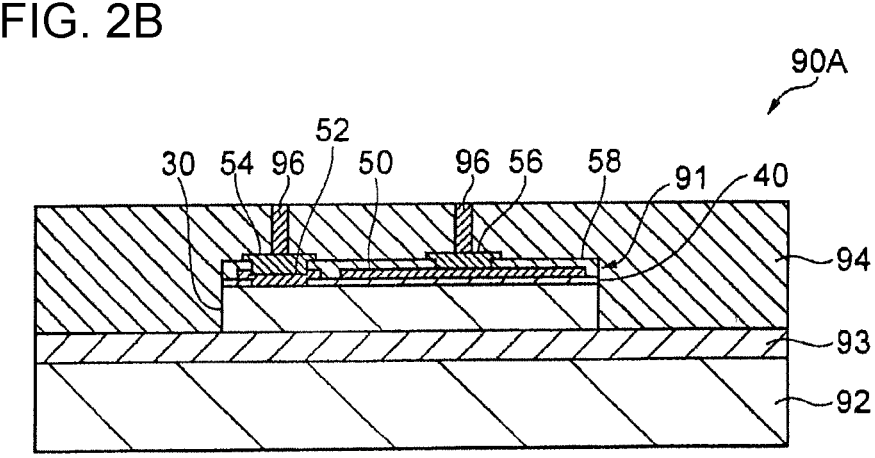
FIG. 2B is a partial enlarged view of the electronic circuit board shown in FIG. 2A.

One example of the electronic circuit board according to the present embodiment is shown in FIG. 2A and FIG. 2B. As shown in FIG. 2A, the electronic circuit board 90 may have a resin substrate 92; a resin layer 93 coating the resin substrate 92; a thin film capacitor 91 provided on an opposite surface of the resin substrate 92 of the resin layer 93; an insulation coating layer 94 coating the resin layer 93 and the thin film capacitor 91; an electronic component 95 provided on the insulation coating layer 94; and a plurality of metal wires 96. At least part of the metal wires 96 may be pulled out to the surface of the resin substrate 92 or the insulation coating layer 94. At least part of the metal wires 96 may be connected to extraction electrodes 54, 56 of the thin film capacitor 91, or may be connected to the electronic component 95. At least part of the metal wires 96 may be penetrating through the electronic circuit board 90 from the surface to the back side of the electronic circuit board 90. Note that, the material of the resin substrate 92 is not particularly limited. For example, the resin substrate 92 may be an epoxy-based resin substrate made of epoxy-based resin.

FIG. 2B is an enlarged schematic diagram in which a part indicated 90A in FIG. 2A is enlarged. As shown in FIG. 2B, the thin film capacitor 91 provided to the electronic circuit board according to the present embodiment may include a first electrode 30; a dielectric thin film 40 provided on a surface of the first electrode 30; a second electrode 50 provided to a part of an opposite surface of the first electrode 30 of the dielectric thin film 40; a through hole electrode 52 provided on the surface of the first electrode 30 by penetrating through a part where the second electrode 50 is not provided among the dielectric thin film 40; an insulation resin layer 58 coating the second electrode 50, the dielectric thin film 40, and the through hole electrode 52; an extraction electrode 54 directly provided on a surface of the through hole electrode 52 by penetrating through the insulation resin layer 58; and an extraction electrode 56 directly provided on a surface of the second electrode 50 by penetrating through the insulation resin layer 58.

Method of Producing Thin Film Capacitor 1

Next, a method of producing the thin film capacitor 1 is described.

A method of forming a thin film which becomes the dielectric thin film 13 at the end is not particularly limited. For example, a vacuum deposition method, a spattering method, a PLD method (pulse laser deposition method), a MO-CVD (Metal Organic Chemical Vapor Deposition) method, a MOD (Metal Organic Deposition) method, a sol-gel method, a CSD (Chemical Solution Deposition) method, and the like may be mentioned. Also, trace amounts of impurities and subcomponents may be included in materials used for forming the thin film, and these may be included as long as properties of the thin film are not compromised.

Among the above-mentioned methods of forming the thin film, when the thin film is made by a PLD method, a spattering method, and a CSD method, the thin film obtained at the end tends to be a polycrystal film. The thin film can also be formed by a CVD method, however when the thin film is made by a PLD method and a spattering method, a composition controllability is high. In the present embodiment, a method of forming the thin film using a PLD method is described.

First, a Si monocrystal substrate is prepared as the substrate 11. Next, the first electrode 12 is formed on the Si monocrystal substrate. A method of forming the first electrode 12 is not particularly limited. For example, a spattering method, a CVD method, and the like may be mentioned. Also, a metal foil such as Ni foil and the like may be used as the first electrode 12 without preparing the substrate 11. When the Ni foil is used as the first electrode 12, it is advantageous since thin film capacitor can be easily mounted to the electronic circuit.

Next, a metal oxide thin film is formed on the first electrode 12 by a PLD method. Also, if necessary, a metal mask may be used to expose part of the first electrode 12 to form an area where the thin film is partially not formed.

First, in a PLD method, a target including constituting elements, that is Sr, Ti, Ca, and Hf, of the dielectric thin film is provided in a chamber for making the thin film. Then, pulse laser is irradiated to the surface of the target. The surface of the target is evaporated instantaneously by strong energy of the pulse laser. Then, evaporated elements are deposited on the substrate 11 or the first electrode 12 which is positioned facing the target, thereby the dielectric thin film (metal oxide thin film) having the main component expressed by the compositional formula $(Sr_{1-x}Ca_x)_m(Ti_{1-y}Hf_y)O_3$ is formed.

A type of the target is not particularly limited, and a metal oxide sintered body and the like including the constituting elements of the metal oxide thin film to be produced can be used. In the present embodiment, oxides of Sr, Ti, Ca, and Hf; composite oxides such as $SrTiO_3$, $CaHfO_3$, and the like; metal compounds which becomes oxides of each metal element after sintering may be mentioned. Also, preferably, each element is evenly distributed in the target, however the distribution may vary within the range which does not influence the quality of the dielectric thin film obtained at the end. Further, the target does not necessarily have to be one, and a plurality of targets each including part of the constituting elements of the metal oxide thin film may be prepared for forming the thin film. A shape of the target is not particularly limited, and it may be a shape suited for a machine used for producing the thin film. Also, by adjusting conditions for forming thin film (oxygen gas pressure, nitrogen gas pressure, size and position of gas injecting tube of the film forming chamber, and the like), m of the metal oxide thin film can be regulated. For example, by changing m of the target, m in the thin film which has been formed can be changed. Also, not only m of the target but also the conditions for forming thin film is also important. This is because, the metal elements evaporated from the target due to pulse laser are influenced by elements constituting the atmosphere of the film forming chamber, and reaches to the film forming surface of the substrate 11 or the first electrode 12.

Also, in case of a PLD method, in order to crystalize the metal oxide thin film, the substrate 11 and/or the first electrode 12 may be heated using infrared laser when forming the thin film. A heating temperature of the substrate 11 and/or the first electrode 12 may differ depending on the constituting elements and the composition of the metal oxide thin film and the substrate 11, and for example it is heat to 300 to 800° C. for forming the thin film. By making the temperature of the substrate 11 to an appropriate temperature, the metal oxide thin film is easily crystallized and also cracks formed while cooling can be prevented.

Next, by performing reduction firing to the metal oxide thin film, a nitridation treatment can be done to the metal oxide thin film, and the dielectric thin film having the dielectric composition including the main component expressed by the compositional formula $(Sr_{1-x}, Ca_x)_m(Ti_{1-y}Hf_y)O_{3-\delta}N_\delta$ can be obtained.

A method of reduction firing is not particularly limited. For example, nitridation of the metal oxide thin film can be done by performing reduction firing to the metal oxide thin film in nitrogen containing atmosphere while carbon and the metal oxide thin film are placed close to each other.

A method for placing the metal oxide thin film and carbon is not particularly limited. For example, a method of using a firing furnace part of which is constituted by carbon; a method of introducing carbon (shape is not particularly limited) into a firing furnace; a method of firing by placing the metal oxide thin film in a container part of which is made of carbon, and the like may be mentioned. Also, two or more methods mentioned in above may be combined. Further, the above-mentioned carbon is not necessarily limited to simple carbon and it may be carbon compounds.

A lower limit of the firing temperature during reduction firing is not particularly limited, and it may a temperature at which reduction firing can be performed thoroughly. An upper limit of the firing temperature is not particularly limited, and it may be a temperature at which the first electrode and the dielectric thin film do not melt. For example, the firing temperature of reduction firing may be 400° C. or higher and 1000° C. or lower, and preferably 600° C. or higher and 900° C. or lower. A firing time of reduction firing is not particularly limited. For example, it may be 30 minutes or longer and 300 minutes or shorter. Oxygen partial pressure in nitrogen gas atmosphere during reduction firing is not particularly limited. For example, the oxygen partial pressure may be $1\times10^3$ Pa or less.

Lastly, by forming the second electrode 14 on the dielectric thin film 13, the thin film capacitor 1 can be produced. Note that, a material of the second electrode 14 is not particularly limited, and Ag, Au, Cu, Ni, and the like can be used. Also, a method for forming the second electrode 14 is not particularly limited. For example, the second electrode 14 can be formed by a spattering method.

Method of Producing Electronic Circuit Board 90

Next, a method of producing the electronic circuit board 90 is described.

The method of producing the electronic circuit board 90 is not particularly limited. For example, it may be produced by a below method. First, a surface of a resin substrate 92 is covered with an uncured resin layer. The uncured resin layer is a precursor of the resin layer 93. The thin film capacitor 91 is provided on the surface of the uncured resin layer. At this time, the thin film capacitor 91 is provided so that the first electrode layer 30 of the thin film capacitor 90 is facing the uncured resin layer. Next, by covering the uncured resin layer and the thin film capacitor 91 with the insulation coating layer 94, the thin film capacitor 91 is placed between the resin substrate 92 and the insulation coating layer 94. Then, the uncured resin layer is heat cured to form the resin layer 93. Next, the insulation coating layer 94 is adhered to the resin substrate 92, the thin film capacitor 91, and the resin layer 93 by heat pressing, thereby a multilayer substrate is formed. Then, a plurality of through holes penetrating the multilayer substrate is formed. Then, a metal wire 96 is formed in each through hole. After forming the metal wire 96, the electronic component 95 is provided to the surface of the insulation coating layer 94. According to the method mentioned in above, the electronic circuit board 90 in which the thin film capacitor 91 is embedded is obtained.

A material of the metal wire 96 is not particularly limited. For example, it may be a conductor such as Cu and the like. A material of the uncured resin layer is not particularly limited. For example, it may be B-stage heat curable resin. A type of the heat curable resin is not particularly limited. For example, it may be an epoxy resin and the like. The B-stage heat curable resin does not completely cure under room temperature and it is completely cured by heating. A material of the insulation coating layer 94 is not particularly limited. For example, it may be an epoxy-based resin, a polytetrafluoroethylene-based resin, a polyimide-based resin, and the like.

Hereinabove, the embodiment of the present invention is described, however the present invention is not limited to such embodiment, and it may be variously modified within the scope of the present invention.

Note that, the dielectric element according to the present invention is an element which uses dielectric properties, and it includes, capacitors, condensers, thermistors, filters, diplexers, resonators, antennas, piezoelectric elements, transistors, ferroelectric memories, and the like. The dielectric thin film according to the present embodiment is suitably used particularly as a power decoupling capacitor.

The electronic circuit board according to the present invention includes the above-mentioned dielectric element. The electronic circuit board according to the present invention is suitably used particularly to an IC package and an electronic substrate module.

EXAMPLES

Hereinafter, the present invention is described based on further detailed examples, and the present invention is not limited thereto.

Experiment 1

First, a $SrCO_3$ powder, a $CaCO_3$ powder, a $TiO_2$ powder, and a $HfO_2$ powder were prepared as raw materials of a sintered body used as a target for forming thin film. The powders were weighed so that x, y, and m of the dielectric thin film obtained at the end satisfied values shown in Table 1.

Next, the powders were placed in a wet ball mill together with water or ethanol as a solvent and mixed for 16 hours, thereby a mixed slurry was obtained.

Then, the mixed slurry was dried for 12 hours at 80° C. by a constant temperature dryer, thereby a mixed product was obtained.

Next, the mixed product was lightly crushed in a mortar, then placed in a ceramic crucible. Then, a heat treatment was carried out for 2 to 5 hours at 700 to 1000° C. under air atmosphere using an electric furnace. Thereby, a calcined product was obtained.

Next, the calcined product was crushed in a mortar, and then finely pulverized for 16 hours by a wet ball mill using water or ethanol as a solvent, thereby a calcined slurry was obtained.

The obtained calcined slurry was dried for 12 hours at 80° C. in a constant temperature dryer, thereby a finely pulverized powder was obtained.

To the finely pulverized powder, a polyvinyl alcohol solution as a binder was added and mixed, thereby a granulated powder obtained. An added amount of the polyvinyl alcohol solution was 0.6 wt % with respect to 100 wt % of the finely pulverized powder.

The granulated powder was molded into a circular disk shape having a diameter of about 23 mm and a thickness of about 9 mm, thereby a molded article was obtained. A molded powder was performed with uniaxial press molding, thereby CIP molding was performed.

The molded article was subjected to a binder removal treatment at 400 to 600° C. under air atmosphere using an electric furnace, then fired at 1200° C. to 1400° C. for 4 to 10 hours, thereby a sintered product was obtained. Further, upper and lower surfaces of the sintered product were mirror polished and the target for forming thin film having a height of 5 mm was obtained. Note that, an obtained target for forming thin film had a relative density of 96 to 98%.

The target for forming thin film as mentioned in above was placed in a film forming device, and a Ni foil which becomes a first electrode at the end was placed so to face the target for forming thin film. Note that, a thickness of the Ni foil was 30 μm.

Next, a dielectric thin film (metal oxide thin film) was formed by a PLD method on the first electrode so that the thickness of the dielectric thin film was 200 nm. Here, by adjusting the film forming condition, m of the obtained metal oxide thin film was regulated. Note that, a length of time for forming the thin film was 0.5 to 2 hours.

Regarding experiments other than Comparative examples 21 and 22, nitridation of the metal oxide thin film was done by reduction firing the metal oxide thin film, thereby the dielectric thin film having the dielectric composition including the main component expressed by a compositional formula $(Sr_{1-x}, Ca_x)_m(Ti_{1-y}Hf_y)O_{3-\delta}N_\delta$ was obtained.

The metal oxide thin film was reduction fired in nitrogen containing atmosphere while the metal oxide thin film and carbon were placed close to each other, thereby nitridation of the metal oxide thin film was performed. Note that, by using a graphite sheet, the metal oxide thin film and carbon were placed close to each other.

By controlling the condition of reduction firing, δ was regulated to the values shown in below table. A firing temperature of reduction firing was 700° C. or higher and 900° C. or lower. A length of time of firing during the reduction firing was 30 minutes or longer and 300 minutes or shorter. Also, oxygen partial pressure in the nitrogen containing atmosphere during the reduction firing was $1 \times 10^3$ Pa or less.

Next, Ni was formed as the second electrode on the obtained dielectric thin film.

The obtained dielectric thin film was measured with a relative permittivity and an insulation resistance at high temperature of 125° C.

The relative permittivity was evaluated by a below method. Regarding the obtained dielectric thin film having a thickness of 200 nm, a relative permittivity was calculated from a thickness of the dielectric thin film and a capacitance measured under conditions of a standard temperature of 25° C. and a frequency of 1 kHz (1 Vrms). Results are shown in Table 1. Note that, a relative permittivity of 200 or higher was considered good.

A Digital Ultra-High Resistance Meter (R8340A made by ADVANTEST) was used to the obtained dielectric thin film having a thickness of 200 nm, thereby an insulation resistance at high temperature was measured by applying DC current of 20V at a standard temperature of 125° C. Results are shown in Table 1. Note that, an insulation resistance at high temperature of $1 \times 10^6$ Ω or more was considered good.

TABLE 1

| Sample No. | Sr 1-x | Ca x | Ti 1-y | Hf y | O 3-δ | N δ | (Sr + Ca)/ (Ti + Hf) m | Relative permittivity | 125° C. Insulation resistance (Ω) |
|---|---|---|---|---|---|---|---|---|---|
| Example 1 | 0.99 | 0.01 | 0.85 | 0.15 | 2.97 | 0.03 | 1.00 | 310 | $2 \times 10^6$ |
| Example 2 | 0.95 | 0.05 | 0.90 | 0.10 | 2.97 | 0.03 | 1.00 | 280 | $7 \times 10^7$ |
| Example 3 | 0.90 | 0.10 | 0.95 | 0.05 | 2.97 | 0.03 | 1.00 | 255 | $9 \times 10^7$ |
| Example 4 | 0.85 | 0.15 | 0.99 | 0.01 | 2.97 | 0.03 | 1.00 | 220 | $4 \times 10^8$ |
| Example 5 | 0.90 | 0.10 | 0.90 | 0.10 | 2.97 | 0.03 | 1.00 | 240 | $1 \times 10^8$ |

TABLE 1-continued

| Sample No. | Sr $1-x$ | Ca $x$ | Ti $1-y$ | Hf $y$ | O $3-\delta$ | N $\delta$ | (Sr + Ca)/ (Ti + Hf) $m$ | Relative permittivity | 125° C. Insulation resistance ($\Omega$) |
|---|---|---|---|---|---|---|---|---|---|
| Example 6 | 0.85 | 0.15 | 0.85 | 0.15 | 2.97 | 0.03 | 1.00 | 210 | $2 \times 10^9$ |
| Comparative example 1 | 0.84 | 0.16 | 0.98 | 0.02 | 2.97 | 0.03 | 1.00 | 170 | $5 \times 10^8$ |
| Comparative example 2 | 0.80 | 0.20 | 0.85 | 0.15 | 2.97 | 0.03 | 1.00 | 160 | $8 \times 10^8$ |
| Comparative example 3 | 1.00 | 0.00 | 0.99 | 0.01 | 2.97 | 0.03 | 1.00 | 290 | $1 \times 10^5$ |
| Comparative example 4 | 1.00 | 0.00 | 0.85 | 0.15 | 2.97 | 0.03 | 1.00 | 260 | $7 \times 10^5$ |
| Example 11 | 0.87 | 0.13 | 0.99 | 0.01 | 2.97 | 0.03 | 1.00 | 210 | $9 \times 10^7$ |
| Example 12 | 0.92 | 0.08 | 0.95 | 0.05 | 2.97 | 0.03 | 1.00 | 310 | $4 \times 10^8$ |
| Example 13 | 0.95 | 0.05 | 0.88 | 0.12 | 2.97 | 0.03 | 1.00 | 330 | $1 \times 10^8$ |
| Example 14 | 0.99 | 0.01 | 0.85 | 0.15 | 2.97 | 0.03 | 1.00 | 250 | $4 \times 10^6$ |
| Comparative example 11 | 0.98 | 0.02 | 0.84 | 0.16 | 2.97 | 0.03 | 1.00 | 280 | $8 \times 10^5$ |
| Comparative example 12 | 0.85 | 0.15 | 0.80 | 0.20 | 2.97 | 0.03 | 1.00 | 180 | $5 \times 10^7$ |
| Comparative example 13 | 0.99 | 0.01 | 1.00 | 0.00 | 2.97 | 0.03 | 1.00 | 170 | $7 \times 10^4$ |
| Comparative example 14 | 0.85 | 0.15 | 1.00 | 0.00 | 2.97 | 0.03 | 1.00 | 160 | $6 \times 10^8$ |
| Example 21 | 0.85 | 0.15 | 0.99 | 0.01 | 2.99 | 0.01 | 1.00 | 210 | $7 \times 10^7$ |
| Example 22 | 0.90 | 0.10 | 0.95 | 0.05 | 2.99 | 0.01 | 1.00 | 255 | $1 \times 10^7$ |
| Example 23 | 0.95 | 0.05 | 0.90 | 0.10 | 2.99 | 0.01 | 1.00 | 280 | $4 \times 10^6$ |
| Example 24 | 0.99 | 0.01 | 0.85 | 0.15 | 2.98 | 0.02 | 1.00 | 280 | $2 \times 10^6$ |
| Comparative example 21 | 0.85 | 0.15 | 0.99 | 0.01 | 3.00 | 0.00 | 1.00 | 140 | $1 \times 10^7$ |
| Comparative example 22 | 0.99 | 0.01 | 0.85 | 0.15 | 3.00 | 0.00 | 1.00 | 190 | $1 \times 10^5$ |
| Comparative example 31 | 0.95 | 0.05 | 0.95 | 0.05 | 2.97 | 0.03 | 0.85 | 180 | Unmeasurable |
| Example 31 | 0.95 | 0.05 | 0.95 | 0.05 | 2.97 | 0.03 | 0.90 | 240 | $4 \times 10^6$ |
| Example 32 | 0.95 | 0.05 | 0.95 | 0.05 | 2.97 | 0.03 | 1.00 | 330 | $4 \times 10^8$ |
| Example 33 | 0.95 | 0.05 | 0.95 | 0.05 | 2.97 | 0.03 | 1.10 | 310 | $6 \times 10^8$ |
| Example 34 | 0.95 | 0.05 | 0.95 | 0.05 | 2.97 | 0.03 | 1.15 | 235 | $1 \times 10^6$ |
| Comparative example 32 | 0.95 | 0.05 | 0.95 | 0.05 | 2.97 | 0.03 | 1.20 | 200 | Unmeasurable |

Examples 1 to 6 and Comparative examples 1 to 4 were experiments in which Ca content (x) was varied. Examples 1 to 6 in which x, y, δ, and m were within the predetermined range such as x satisfied 0<x≤0.15 had excellent relative permittivity and insulation resistance at high temperature. On the contrary, Comparative examples 1 and 2 in which Ca content (x) was too large had a low relative permittivity. Also, Comparative examples 3 and 4 in which Ca content (x) was too small had a low insulation resistance at high temperature.

Examples 11 to 14 and Comparative examples 11 to 14 were experiments in which Hf content (y) was mainly varied. Examples 11 to 14 in which x, y, δ, and m were within the predetermined range such as y satisfied 0<y≤0.15 had excellent relative permittivity and insulation resistance at high temperature. On the contrary, Comparative examples 11 to 14 in which Hf content (y) was out of the above-mentioned range, a relative permittivity and/or an insulation resistance at high temperature was too low. Note that, the relative permittivity or the insulation resistance at high temperature decreased depending on Ca content (x).

Examples 21 to 24 and Comparative examples 21 to 22 were experiments in which N content (δ) was varied. Examples 21 to 24 in which x, y, δ, and m were within the predetermined range such as δ satisfied 0<δ≤0.03 had excellent relative permittivity and insulation resistance at high temperature. On the contrary, Comparative examples 21 to 22 in which N content (δ) was zero, a relative permittivity and/or an insulation resistance at high temperature was too low. Note that, the relative permittivity or the insulation resistance at high temperature decreased depending on Ca content (x) and Hf content (y).

Examples 31 to 34 and Comparative examples 31 to 32 were experiments in which compositions other than m were same (x, y, and δ were same), and only m was varied. Examples 31 to 34 in which x, y, δ, and m were within the predetermined range such as m satisfied 0.90≤m ≤1.15 had excellent relative permittivity and insulation resistance at high temperature. On the contrary, Comparative examples 31 and 32 in which m was out of the above-mentioned range had significantly low insulation resistance at high temperature and it was unmeasurable. Further, Comparative examples 31 in which m was too small (a total content of Sr and Ca was too small) had a low relative permittivity.

Figure 3:
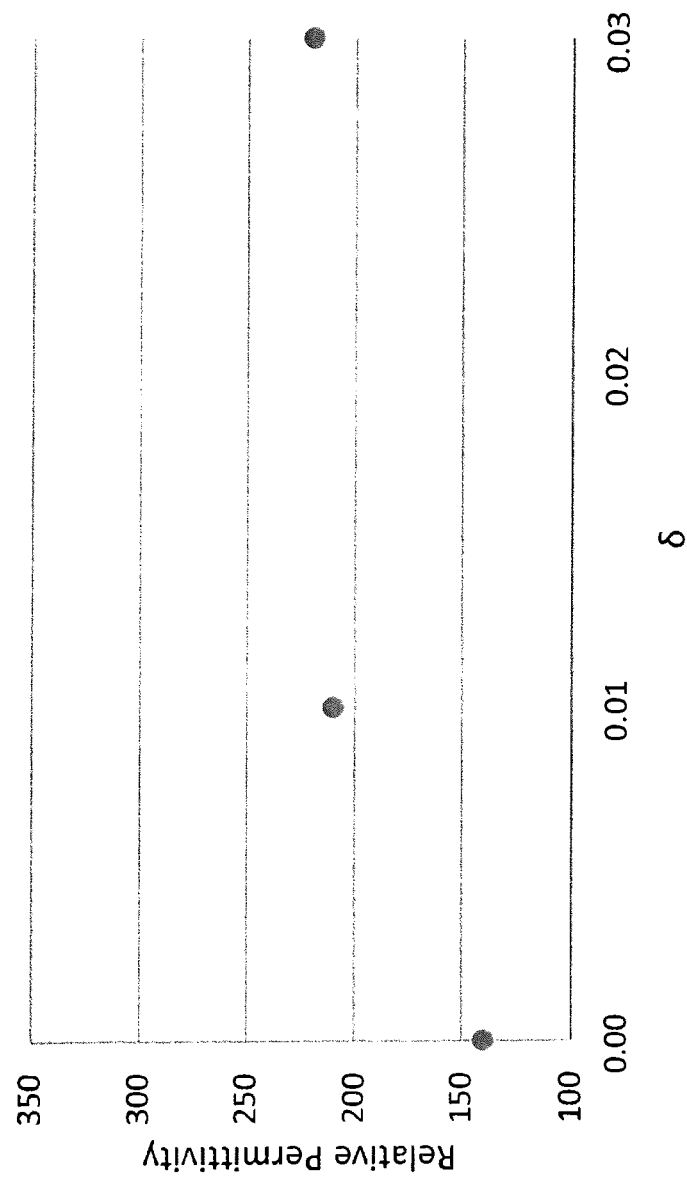
FIG. 3 is a graph showing a relationship between N content and a relative permittivity.
Figure 4:
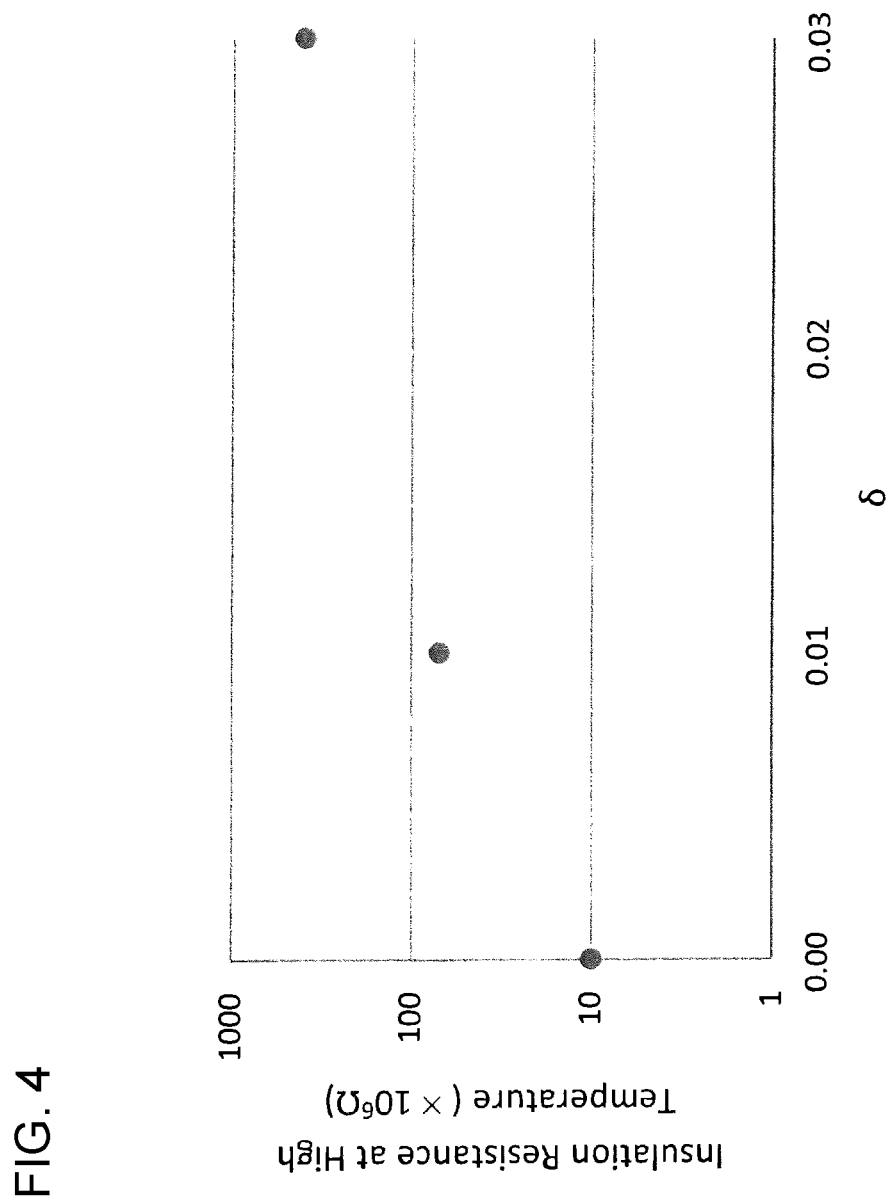
FIG. 4 is a graph showing a relationship between N content and an insulation resistance at high temperature.
Figure 5:
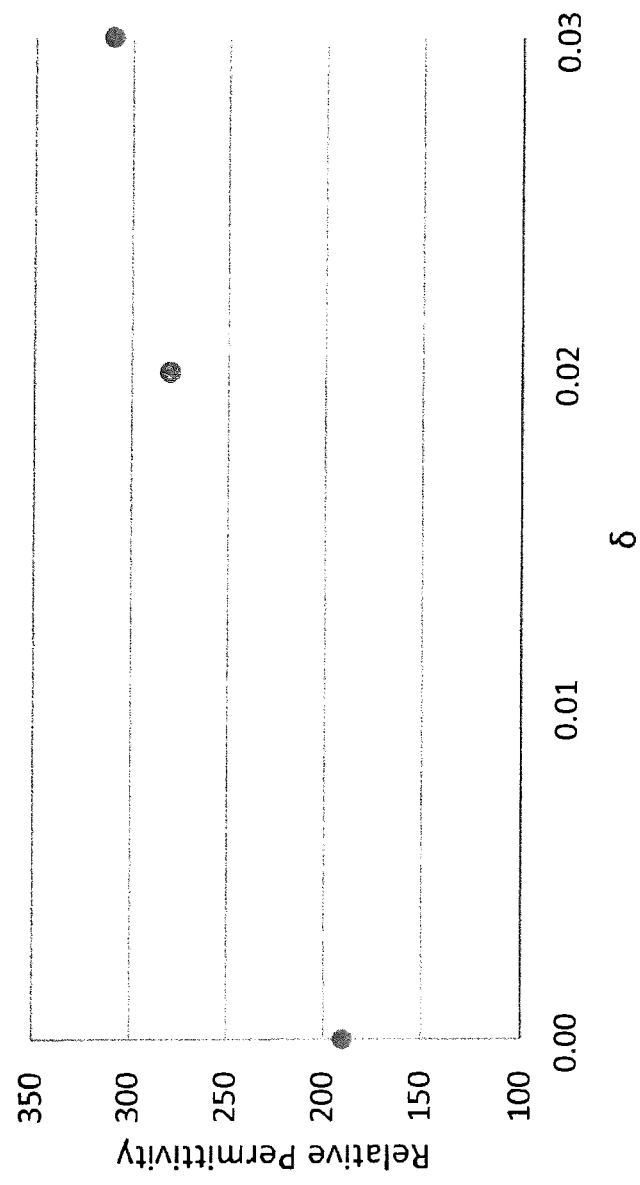
FIG. 5 is a graph showing a relationship between N content and a relative permittivity.
Figure 6:
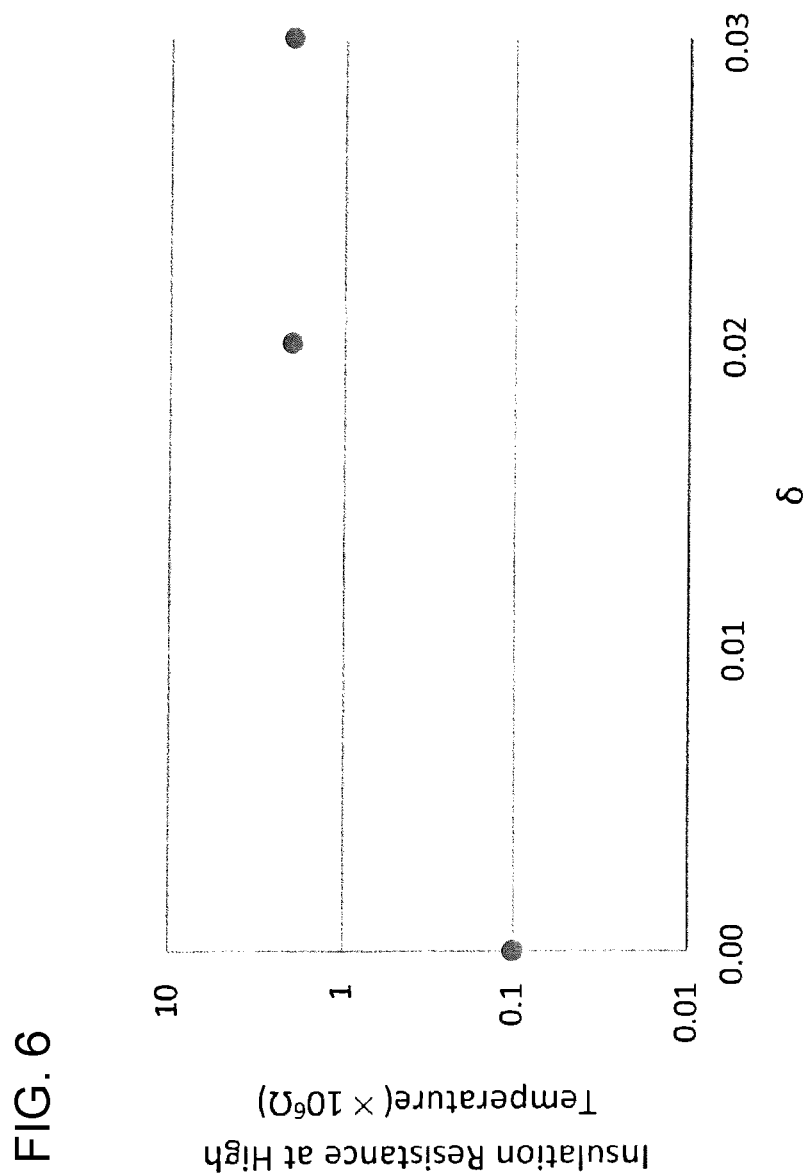
FIG. 6 is a graph showing a relationship between N content and an insulation resistance at high temperature.

Also, FIG. 3 and FIG. 4 shows graphs in which a horizontal axis is N content (δ) and plotting results of Comparative example 21, Example 21, and Example 4. These Comparative example and Examples had same experiment condition except for N content (δ). FIG. 5 and FIG. 6 shows graphs in which a horizontal axis is N content (δ) and plotting results of Comparative example 22, Example 24, and Example 1. These Comparative example and Examples had same experiment condition except for N content (δ).

According to FIG. 3 to FIG. 6, it can be understood that the relative permittivity and the insulation resistance at high temperature tend to increase as N content (δ) increased.

NUMERICAL REFERENCES

1 . . . Thin film capacitor
11 . . . Substrate
12 . . . First electrode
13 . . . Dielectric thin film
14 . . . Second electrode
90 . . . Electronic circuit board
91 . . . Thin film capacitor
30 . . . First electrode
40 . . . Dielectric thin film
50 . . . Second electrode
52 . . . Through hole electrode
54, 56 . . . Extraction electrode
58 . . . Insulation resin layer
92 . . . Resin substrate
93 . . . Resin layer
94 . . . Insulation coating layer
95 . . . Electronic component
96 . . . Metal wire

What is claimed is:

1. A dielectric composition comprising a main component expressed by a compositional formula $(Sr_{1-x}Ca_x)_m(Ti_{1-y}Hf_y)O_{3-\delta}N_\delta$, in which
   $0.01 \leq x \leq 0.15$,
   $0.01 \leq y \leq 0.15$,
   $0.90 \leq m \leq 1.15$, and
   $0.01 \leq \delta \leq 0.03$ are satisfied.

2. A dielectric thin film comprising the dielectric composition according to claim 1.

3. A dielectric element comprising the dielectric thin film according to claim 2 and an electrode.

4. The dielectric element according to claim 3, wherein the electrode is an Ni foil and the dielectric thin film is formed on the Ni foil.

5. An electronic circuit board comprising the dielectric element according to claim 3.

6. The electronic circuit board comprising the dielectric element according to claim 4.

* * * * *